United States Patent
Shirata (10) Patent No.: US 8,248,431 B2
(45) Date of Patent: Aug. 21, 2012

(54) IMAGE PROCESSING APPARATUS, IMAGE PROCESSING METHOD, PROGRAM, AND RECORDING MEDIUM

(75) Inventor: Yasunobu Shirata, Tokyo (JP)

(73) Assignee: Ricoh Company Ltd., Tokyo (JP)

( * ) Notice: Subject to any disclaimer, the term of this patent is extended or adjusted under 35 U.S.C. 154(b) by 602 days.

(21) Appl. No.: 12/453,240

(22) Filed: May 4, 2009

(65) Prior Publication Data
US 2009/0295824 A1 Dec. 3, 2009

(30) Foreign Application Priority Data
Jun. 2, 2008 (JP) ................. 2008-144099

(51) Int. Cl.
- G09G 5/00 (2006.01)
- G09G 5/02 (2006.01)
- G03F 3/08 (2006.01)
- G06K 9/00 (2006.01)
- G06K 9/40 (2006.01)
- H04N 5/44 (2006.01)
- H04N 9/64 (2006.01)
- H04N 5/202 (2006.01)
- G06K 9/68 (2006.01)

(52) U.S. Cl. ........ 345/589; 345/590; 345/600; 345/606; 345/618; 348/254; 348/560; 348/649; 348/671; 358/518; 358/520; 358/525; 382/167; 382/254; 382/274; 382/219

(58) Field of Classification Search .................. 345/428, 345/581, 589–590, 591, 593, 586, 600–606, 345/618–619; 348/254–256, 560, 649, 671–674, 348/703, 708; 382/162–167, 190, 254, 218–220, 382/274, 276, 181, 219; 358/448–453, 500–501, 358/505, 515, 518–520, 523–525
See application file for complete search history.

(56) References Cited

U.S. PATENT DOCUMENTS
7,706,887 B2 * 4/2010 Tai et al. ................... 607/54
7,729,025 B2 * 6/2010 Eguchi et al. ............. 358/539
(Continued)

FOREIGN PATENT DOCUMENTS
JP 2003-069822 3/2003
(Continued)

OTHER PUBLICATIONS

Yang, M-H et al., "Detecting Faces in Images: A Survey:", IEEE Transactions on Pattern Analysis and Machine Intelligence, Jan. 2002, vol. 24, No. 1, pp. 34-54.

Primary Examiner — Wesner Sajous
(74) Attorney, Agent, or Firm — Harness, Dickey & Pierce, P.L.C.

(57) ABSTRACT

An image processing apparatus is disclosed that includes an extraction unit extracting predetermined color areas from an input image, a calculation unit calculating each of representative colors of the extracted predetermined color areas, an evaluation unit evaluating whether hue values of the representative colors of the predetermined color areas are distributed in both directions from the hue value of a target color, and a color correcting unit, in which when it is determined that the hue values of the representative colors of the predetermined color areas are not distributed in both directions from the hue value of the target color, color correction is performed on the predetermined color areas.

12 Claims, 9 Drawing Sheets

U.S. PATENT DOCUMENTS

| | | | |
|---|---|---|---|
| 2004/0165094 A1* | 8/2004 | Fukui | 348/333.12 |
| 2006/0012839 A1* | 1/2006 | Fukuda | 358/518 |
| 2006/0012840 A1* | 1/2006 | Fukuda | 358/518 |
| 2006/0126941 A1* | 6/2006 | Higaki | 382/190 |
| 2006/0215205 A1 | 9/2006 | Ohyama et al. | |
| 2007/0030504 A1 | 2/2007 | Kawamoto et al. | |
| 2007/0053009 A1 | 3/2007 | Ito et al. | |
| 2007/0058224 A1 | 3/2007 | Kawamoto et al. | |
| 2007/0064267 A1 | 3/2007 | Murakata et al. | |
| 2007/0070405 A1 | 3/2007 | Murakata et al. | |
| 2007/0070438 A1 | 3/2007 | Yoshida et al. | |
| 2007/0086068 A1 | 4/2007 | Ohkawa et al. | |
| 2007/0226692 A1 | 9/2007 | Nozawa et al. | |
| 2007/0262985 A1* | 11/2007 | Watanabe et al. | 345/420 |
| 2008/0037036 A1 | 2/2008 | Togami et al. | |
| 2008/0181494 A1* | 7/2008 | Watanabe et al. | 382/167 |
| 2009/0002732 A1 | 1/2009 | Shirata | |
| 2009/0002737 A1* | 1/2009 | Kuno | 358/1.9 |
| 2009/0060326 A1* | 3/2009 | Imai et al. | 382/167 |
| 2010/0128058 A1* | 5/2010 | Kawabata et al. | 345/593 |
| 2010/0165137 A1* | 7/2010 | Koishi | 348/222.1 |

FOREIGN PATENT DOCUMENTS

| | | |
|---|---|---|
| JP | 2006-033382 | 2/2006 |

* cited by examiner

IMAGE PROCESSING APPARATUS, IMAGE PROCESSING METHOD, PROGRAM, AND RECORDING MEDIUM

CROSS-REFERENCE TO RELATED APPLICATIONS

The present application claims priority under 35 U.S.C §119 to Japanese Patent Application Publication No. 2008-144099 filed Jun. 2, 2008, the entire contents of which are hereby incorporated herein by reference.

BACKGROUND OF THE INVENTION

1. Field of the Invention

The present invention generally relates to an image processing apparatus and an image processing method performing color correction in accordance with a feature of a color area to be color-corrected when an image input by a scanner, a camera or the like is output to a printer or a display.

2. Description of the Related Art

In recent years, the chances of handling photographs as digital image data have been increasing with the spread of personal computers, the Internet, printers for home use and the like and with the increase of the capacity of recording media. As a result, digital cameras have been becoming popular as means for inputting digital photographic image data (hereinafter simplified as "image data").

In a process of producing a photographic print from the image data taken by a digital camera, a correction process is generally performed on the image data so as to be reproduced to have appropriate colors and density. Namely, in a process of reproducing colors, it is important that colors are reproduced so that a person feels the reproduced colors are appealing. Therefore, colors expressing a human skin color, blue of blue sky, green of trees and grasses, and the like are required to be reproduced so that a person feels the reproduced colors are appealing.

As an example of an image processing method focusing on the colors of human skin, there is a known method in which a human face area is automatically extracted from image data and the color data of the extracted human face area are corrected so as to have a density within the target density range or so as to have a color similar to the target color (chromaticity). Further, in such a correction method, when plural human faces are taken and included in the image data, it is conceived that an average density of all the face areas is calculated and a correction is uniformly made with respect to each face area based on the difference between the calculated averaged density value and a target density value.

For example, Japanese Patent Application Publication No. 2006-33382 discloses a method in which a predetermined color area is extracted; each importance level with respect to the corresponding extracted color areas is automatically determined based on, for example, the size of the area, the position of the area in the image data; a single overall representative color is calculated by weighted averaging the representative colors of the extracted areas, the weighting of each extracted area being determined based on the determined importance level of the corresponding area; and the color correction is performed in a manner so that the calculated overall representative color is corrected to a target color.

However, colors and density of human faces may vary greatly. Therefore, for example, in a case where plural colors of the human faces are distributed in both directions from a center target color, if a single overall representative color is determined by performing weighted averaging plural representative colors of each face based on the corresponding importance levels of the extracted areas of the faces and representative colors are uniformly corrected in the same manner as the correction from the determined overall representative color to the target color, some colors of the faces may be more separated from the target color than when compared with a case before the color correction is performed.

SUMMARY OF THE INVENTION

The present invention is provided to resolve at least one of the above problems and may provide an image processing apparatus, an image processing method, a program, and a recording medium capable of appropriately performing color correction in response to a feature of a predetermined color area by evaluating whether colors of plural predetermined color areas (such as a human face) taken in an image are distributed in both directions from a target color and changing color correction conditions based on the evaluation result.

According to an aspect of the present invention, there is provided an image processing apparatus including an extraction unit extracting predetermined color areas from an input image, a calculation unit calculating each of representative colors of the extracted predetermined color areas, an evaluation unit evaluating whether hue values of the representative colors of the predetermined color areas are distributed in both directions from the hue value of a target color, and a color correcting unit, in which when it is determined that the hue values of the representative colors of the predetermined color areas are not distributed in both directions from the hue value of the target color, color correction is performed on the predetermined color areas.

An object of the configuration is that color correction is to be preformed based on a result of the evaluation whether the hue values of the representative colors of the predetermined color areas are not distributed in both directions from the hue value of the target color.

Therefore with this configuration, when it is determined that the hue values of the representative colors of the predetermined color areas are not distributed in both directions from the hue value of the target color, the color correction is performed on the predetermined color areas. Therefore, it becomes possible to appropriately perform color correction in accordance with a feature of the predetermined color areas.

BRIEF DESCRIPTION OF THE DRAWINGS

Other objects, features, and advantages of the present invention will become more apparent from the following description when read in conjunction with the accompanying drawings, in which.

DETAILED DESCRIPTION OF THE PREFERRED EMBODIMENTS

In the following, embodiments of the present invention are described with reference to the accompanying drawings.

First Embodiment

Figure 1:
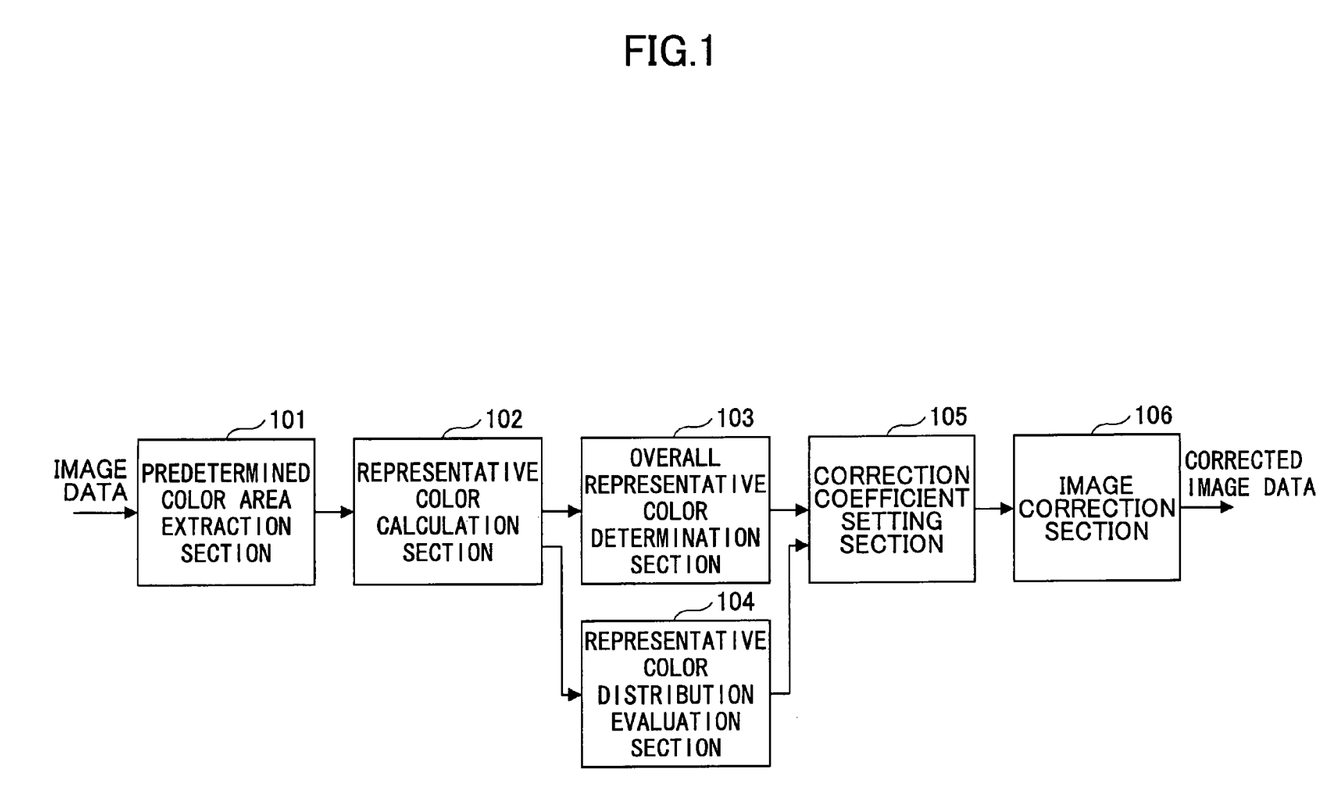
FIG. 1 is a drawing showing a configuration of an image processing apparatus according to a first embodiment of the present invention.

FIG. 1 shows an exemplary configuration of an image processing apparatus according to a first embodiment of the present invention. As shown in FIG. 1, the image processing apparatus includes a predetermined color area extraction section 101, a representative color calculation section 102, an overall representative color determination section 103, a representative color distribution evaluation section 104, a correction coefficient setting section 105, and an image correction section 106. The predetermined color area extraction section 101 receives image data (in RGB values) to be processed from a digital camera or the like. Herein, as a predetermined color area, a human skin area indicating a skin color of a human face is described as a representative example of the predetermined color area. However, other color areas indicating blue sky, trees, grasses, and the like may also be applied to the descriptions below. The predetermined color area extraction section 101 extracts a predetermined color area to be corrected from the received image data. As an area extraction method that can be used in the predetermined color area extraction section 101, for example, a known method using human face data detected by a human face detecting function or a method of selecting arbitrary hue or chroma values determined in advance may be used.

The representative color calculation section 102 calculates a representative color based on the color data of the predetermined color area extracted by the predetermined color area extraction section 101. In this case, for example, if plural persons are taken (included) in the received image data, the representative colors of the predetermined color areas are separately calculated. Herein, the representative color may be, but is not limited to, an average value, a median value, and a modal (most-frequently observed) value of a hue, chroma, or luminosity value of the pixels in the predetermined color area.

The overall representative color determination section 103 determines, when there are plural predetermined color areas, a single overall representative color of the received image data based on the representative colors with respect to each predetermined color area. For example, the overall representative color of the received image data may be determined (calculated) by averaging the representative colors each calculated in the corresponding predetermined color areas.

The representative color distribution evaluation section 104 evaluates how the representative colors calculated with respect to each predetermined color area are distributed with respect to a correction target color of the predetermined color areas determined in advance. Further, the representative color distribution evaluation section 104 calculates the difference between each representative color of the corresponding determined color areas and the correction target color determined in advance and outputs a distribution evaluation result obtained based on the calculation results of the differences.

The correction coefficient setting section 105 calculates and outputs a correction coefficient based on the overall representative color determined by the overall representative color determination section 103, the distribution evaluation result obtained by the representative color distribution evaluation section 104, and the correction target color of the predetermined color areas, the correction target color being determined in advance, so that the correction coefficient is used in the image correction section 106. The image correction section 106 performs color correction using the correction coefficient set (calculated) by the correction coefficient setting section 105.

Figure 2:
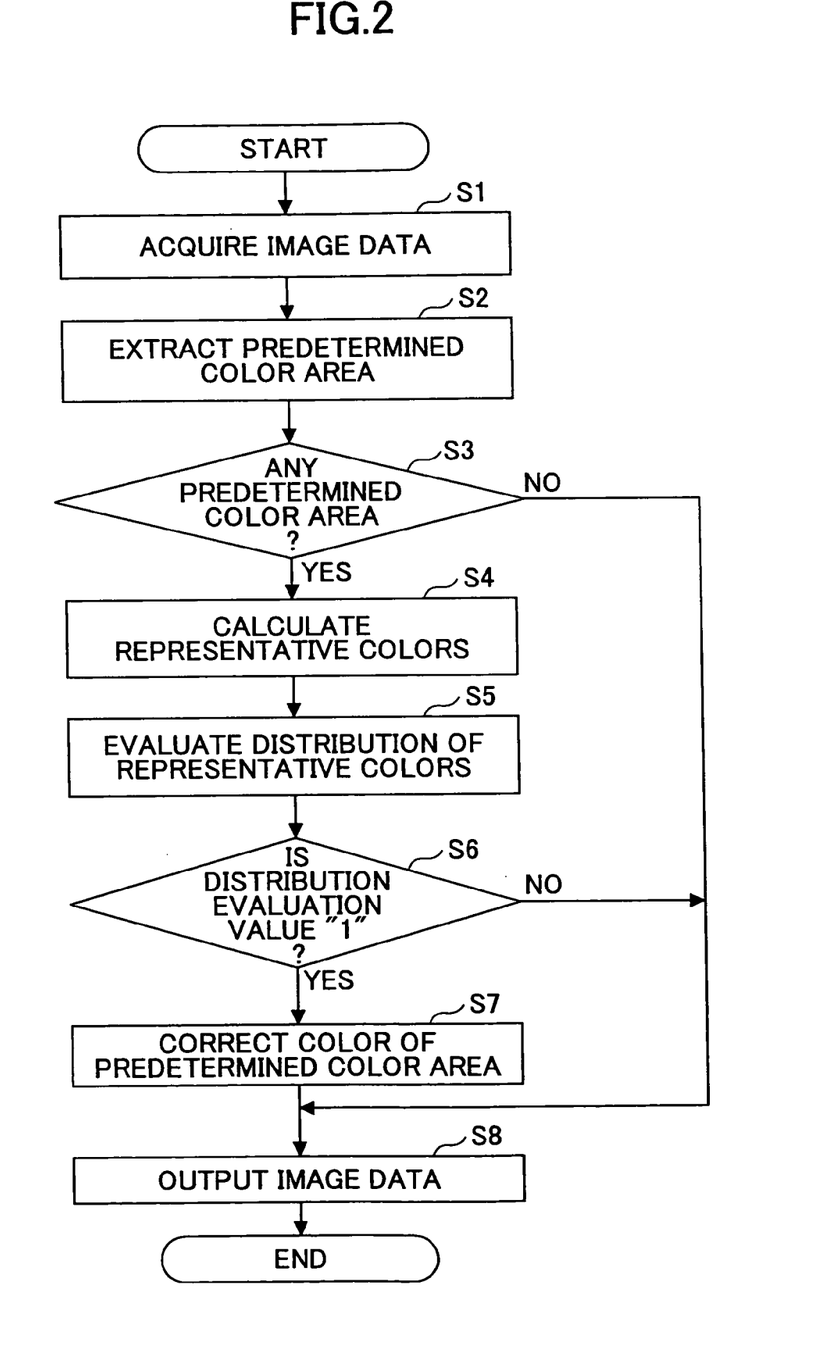
FIG. 2 is a flowchart showing an image correction process according to the first embodiment of the present invention.

FIG. 2 is a flowchart showing an image correction process according to the first embodiment of the present invention. As shown in FIG. 2, first, the predetermined color area extraction section 101 acquires input image data (in step S1), extracts (searches for) the predetermined color area (in step S2), and determines whether there exists any predetermined color area (in step S3). When it is determined that there exists no predetermined color area (NO in step S3), the process goes to step S8.

When it is determined that there exists the predetermined color area (YES in step S3), the representative color calculation section 102 calculates the representative color of the predetermined color areas (in step S4). The calculation of the representative color is performed with respect to each predetermined color area extracted in step S2. Then, the representative color distribution evaluation section 104 calculates an evaluation value of the distribution (a distribution evaluation value) of the representative colors (in step S5). The distribution evaluation value is described in detail below.

The representative color distribution evaluation section 104 determines whether the distribution evaluation value (described below) is "1" (in step S6). When NO is determined (the distribution evaluation value is not "1") in step S6, the process goes to step S8. On the other hand, when YES is determined (the distribution evaluation value is "1") in step S6, the image correction section 106 performs the color correction with respect to the predetermined color areas using the correction coefficient (in step S7) and outputs the corrected image data or the received image data (in step S8).

As a method of extracting the predetermined color area, for example, if a human skin area is required to be extracted, a method of detecting a human face based on a human face detecting function or a method of extracting (detecting) a human face area by selecting arbitrary hue and chroma values may be used.

To detect a human face, a face rectangular area may be detected by using a method described in "Yang, et al. "Detecting Faces in Images: A Survey" IEEE TRANSACTION ON PATTERN ANALYSIS AND MACHINE INTELLIGENCE, Vol. 24, No. 1, January 2002". Then, detected position data of both eyes are acquired, a predetermined rectangular area having a first line segment connecting the positions of the both eyes and a second line segment orthogonal to the first line segment as sides is determined, and average values and a covariance matrix of RGB values of the pixels within the determined rectangular area are calculated. Then, skin-color pixels are determined when the average values and the covariance matrix of RGB values and the Mahalanobis distances of the RGB values of each pixel within the detected face rectangular area of the pixel is equal to or less than the corresponding threshold values, and a group of the determined skin-color pixels is regarded as the human skin area.

The representative color is calculated with respect to each of the extracted predetermined color areas, and, each representative color may be determined as, for example, an average value of the RGB values in the corresponding predetermined color area. The distribution of the representative colors is evaluated based on a comparison with a target color "D" in the predetermined color area determined in advance.

The representative colors of the predetermined color areas are expressed in RGB values and are converted into the LHC (Luminosity, Chroma, Hue) space. However, the representative colors may be converted into other color spaces such as YCbCr, L*u*v*, HSV, and HSL.

In a case where the target color data are stored as data in the LCH space as well, first, a difference between the hue value of the representative color and the hue value of the target color is calculated. An index number is uniquely allocated to each of the predetermined color areas, and when a symbol "N" denotes the number of extracted predetermined color areas, a symbol "Hj" denotes a hue value of the "j"th predetermined color area ($1 \leq j \leq N$), a symbol "Hd" denotes a hue value of the target color "D", and the difference in hue value "Dj" of the "j"th predetermined color area ($1 \leq j \leq N$) is described as Dj=Hd−Hj.

Next, the sign of "Dj" is evaluated. In this evaluation, it is determined whether all the signs of "Dj" are the same regardless of the sign being "+" or "−". When it is determined that all the signs of "Dj" are the same, data "1" is assigned as the distribution evaluation value "E". Otherwise, data "0" is assigned to the distribution evaluation value "E". This distribution evaluation value indicates whether the hue values "Hj" of the predetermined areas are distributed in both directions from the hue value "Hd" of the target color.

In the color correction process of the predetermined color areas, the single overall representative color determined based on each representative color of the predetermined color areas is used. In this case, the explanation is given assuming that the importance level of all the predetermined color areas is the same. As a method of calculating the single overall representative color "M", the representative colors of all the predetermined color areas may be averaged. Namely, the average value of the representative colors of the all the predetermined color areas may be used as the single overall representative color. Then, the correction coefficient is determined based on the single overall representative color "M" and the target color "D", and the color correction is performed on the predetermined color areas based on the determined correction coefficient.

By doing in this way, when each hue value of the representative color of the predetermined colors areas are distributed in one direction from (one side of) the hue value of the target color, each of the representative colors are corrected as a whole in the direction to the target value. On the other hand, when the representative colors of the predetermined colors areas are distributed in both directions from the hue value of the target color, no color correction is performed to prevent the case where a representative color is corrected to the direction opposite to the direction closer to the target color. In this embodiment, the distribution of the representative colors of the predetermined color areas is evaluated based on the hue value of the target color. However, the distribution may be evaluated based on other factors such as a chroma value or a luminosity value.

Second Embodiment

In the following, a second embodiment of the present invention is described. In the second embodiment, the distribution of the representative colors of the predetermined color areas with respect to the target color is evaluated and the colors (of the image data) is corrected based on the importance levels of the predetermined color areas.

Figure 3:
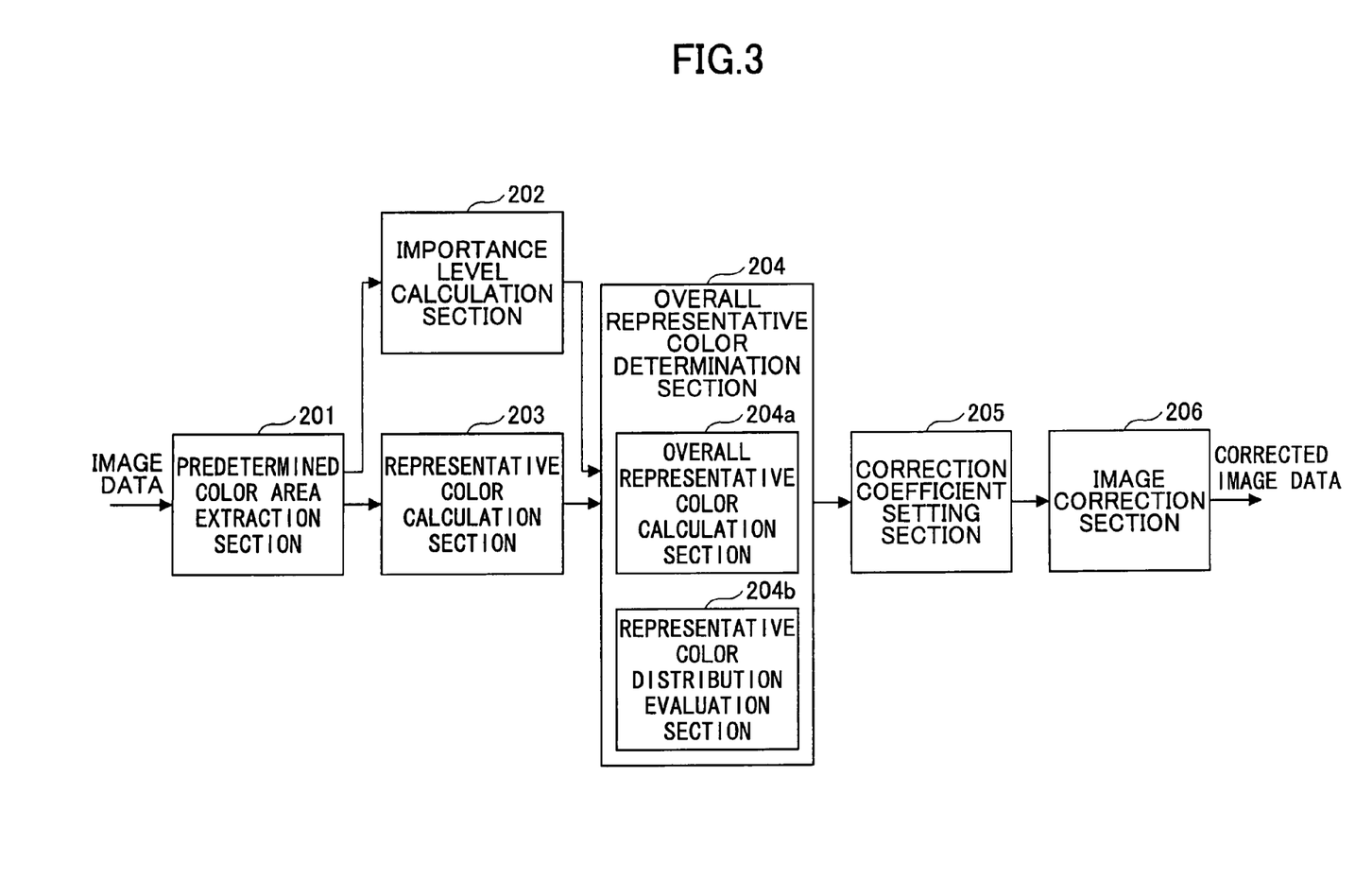
FIG. 3 is a drawing showing a configuration of an image processing apparatus according to a second embodiment of the present invention.

FIG. 3 shows an exemplary configuration of the image processing apparatus according to the second embodiment of the present invention. As shown in FIG. 3, the image processing apparatus includes a predetermined color area extraction section 201, an importance level calculation section 202, a representative color calculation section 203, an overall representative color determination section 204 having an overall representative color calculation section 204a and a representative color distribution evaluation section 204b, a correction coefficient setting section 205, and an image correction section 206. The predetermined color area extraction section 201 is similar to the predetermined color area extraction section 101 in the first embodiment and extracts a predetermined color area from an input (received) image data so that the extracted predetermined color area is corrected. When plural predetermined color areas are extracted by the predetermined color area extraction section 201, the importance level calculation section 202 determines (calculates) each importance level of the extracted predetermined color areas.

The representative color calculation section 203 is similar to the representative color calculation section 102 and calculates each representative color of the predetermined color areas extracted by the predetermined color area extraction section 201.

The representative color distribution evaluation section 204b evaluates how the representative colors calculated from the extracted predetermined color areas are distributed with respect to the correction target color of the predetermined color areas determined in advance. Further, the representative color distribution evaluation section 204b calculates the difference between each representative color of the determined color area and the correction target color determined in advance and outputs a distribution evaluation result obtained based on the calculated differences. When plural predetermined color areas are extracted by the predetermined color area extraction section 201, the overall representative color calculation section 204a determines the single overall representative color of the input (received) image data based on the importance levels of the predetermined color areas, the representative colors of the predetermined color areas, and the distribution evaluation result of the representative colors of the predetermined color areas.

The correction coefficient setting section 205 calculates and outputs a correction coefficient based on the overall representative color determined by the overall representative color determination section 204, and the correction target color set in advance, so that the correction coefficient is used in the image correction section 206. The image correction section 206 performs color correction using the correction coefficient set (calculated) by the correction coefficient setting section 205.

Figure 4:
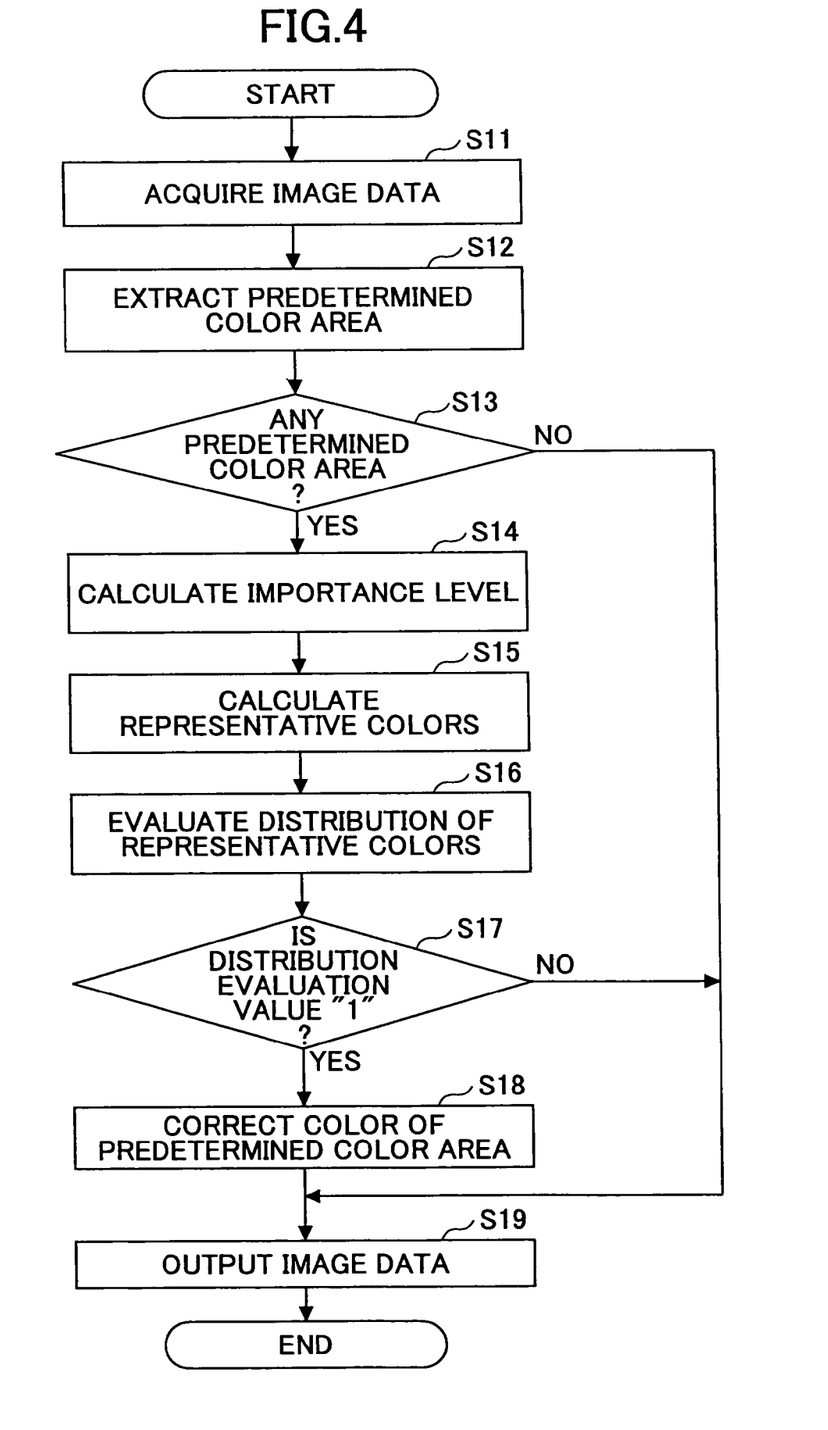
FIG. 4 is a flowchart showing an image correction process according to the second embodiment of the present invention.

FIG. 4 shows a flowchart showing an image correction process according to the second embodiment of the present invention. In the flowchart of FIG. 4, the process of steps S11 through S13 are performed in the same manner as in the process of steps S1 though S3 in FIG. 2. In step S13, when it is determined that there exists the predetermined color area (YES in step S13), the process goes to step S14. In step S14, the importance level calculation section 202 calculates each importance level of the predetermined color areas extracted in step S12. In step S15, the representative color calculation section 203 calculates each representative color of the predetermined color areas extracted in step S12. In step S16, the overall representative color determination section 204 evaluates the distribution of the representative colors. In step S17, it is determined whether the distribution evaluation value of the representative colors is "1". When NO is determined in step S17, the process goes to step S19, and when YES is determined in step S17, the process goes to step S18. In step S18, the image correction section 206 performs the color correction with respect to the predetermined color areas and, in step S19, outputs the corrected image data or the received image data.

A description of the method of extracting the predetermined color area is omitted herein because the same method as in the first embodiment of the present invention is used. The importance level is calculated with respect to each of the predetermined color areas extracted in step S12 based on the size of the color area and the position of the color area in the input image data. For example, when the importance level is calculated based on the size of the color area, the importance level "Is(j)" is given as the following formula:

$$Is(j)=S(j)/Smax$$

Wherein a symbol "j" denotes an index uniquely assigned to each of "N" extracted predetermined areas (1≦j≦N); a symbol "S(j)" denotes the area (or number of pixels) of the $j^{th}$ predetermined color area; and a symbol "Smax" denotes the maximum value among S(1) through S(N).

Further, when the importance level is calculated based on the position of the color area in the input (received) image data, the position of each center of gravity the extracted predetermined color areas is obtained (calculated).

Figure 5:
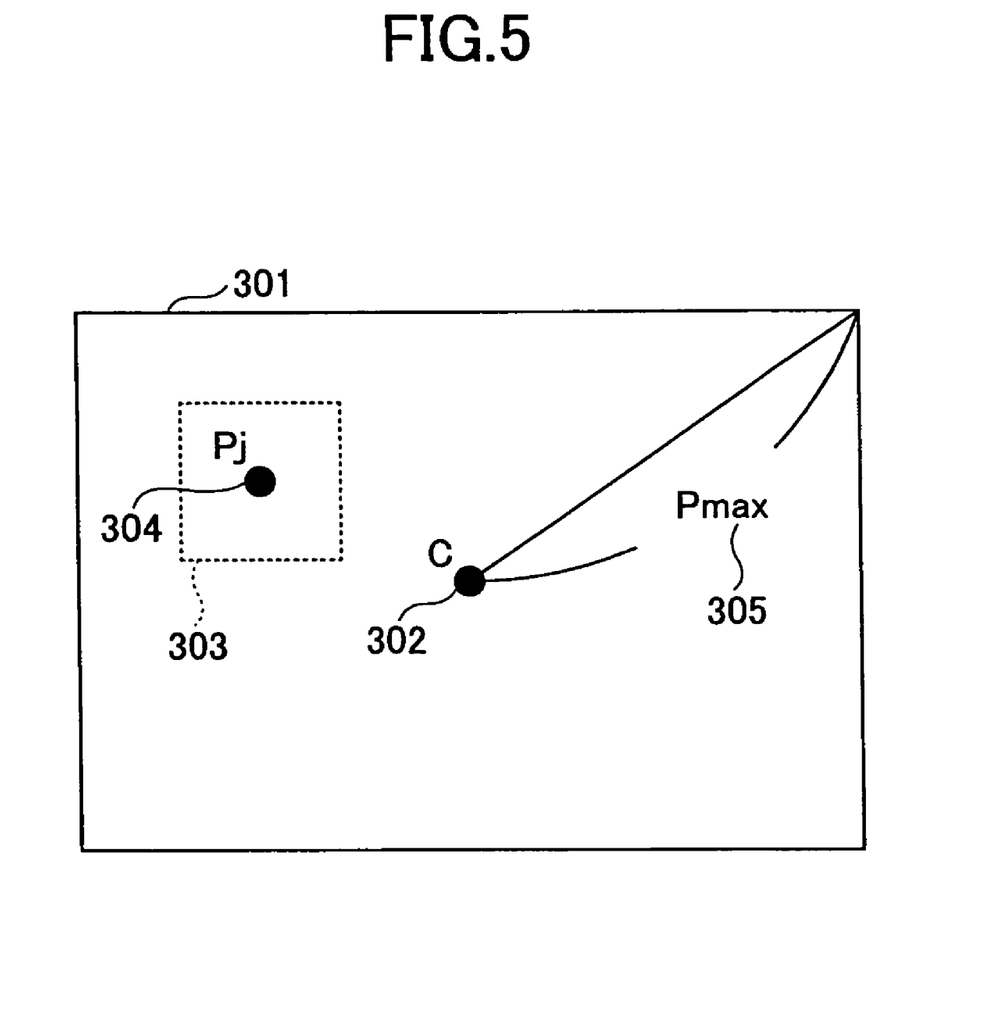
FIG. 5 is a drawing showing a calculation of an importance level.

FIG. 5 shows how to determine the importance level based on the position of the predetermined color area in the input image. As shown FIG. 5, an image data 301 has its center position "C" 302. A predetermined color area 303 included in the image data 301 has its center of gravity "Pj" 304. The maximum distance from the center position "C" to an edge of the image data is given as "Pmax" 305.

In this case, the importance level "Ip(j)" is given as the following formula:

$$Ip(j)=1-(|Pj-c|/Pmax)$$

Wherein a symbol "j" denotes an index uniquely assigned to each of "N" extracted predetermined areas (1≦j≦N); and a symbol "P(j)" denotes the center of gravity of the $j^{th}$ predetermined color area.

The representative color is calculated with respect to each of the extracted predetermined color areas, and, each representative color may be determined and set as, for example, an average value of the RGB values in the corresponding predetermined color areas. The distribution of the representative colors is evaluated based on a comparison with a target color "D" in the predetermined color area determined in advance. The representative colors of the predetermined color areas are expressed in RGB values and are converted into the LHC (Luminosity, Chroma, Hue) space. However, the representative colors may be converted into other color spaces such as YCbCr, L*u*v*, HSV, and HSL. In a case where the target color (data) are stored in the LCH space as well, a difference between the hue value of the representative color and the hue color of the target color is calculated.

Index numbers are uniquely allocated to each of the predetermined color areas, and when a symbol "N" denotes the number of extracted predetermined color areas, a symbol "Hj" denotes a hue value of the "j"th predetermined color area (1≦j≦N), a symbol "Hd" denotes a hue value of the target color "D", and the difference in hue value "Dj" (1≦j≦N) is described as Dj=Hd−Hj. Further, concurrently, the single overall representative color is calculated based on the representative colors of the designated color areas. In this case, the single overall representative color "M" is calculated by performing weighted averaging of the representative colors of the predetermined color areas using the importance levels (such as the "Is(j)" or "Ip(j)") of the predetermined color areas.

Next, the sign of the "Dj" is evaluated. In this evaluation, it is determined whether all the signs of "Dj" are the same regardless of the sign being "+" or "−". When it is determined that all the signs of "Dj" are the same, data "1" is assigned to the distribution evaluation value "E". Otherwise, data "0" is assigned to the distribution evaluation value "E". This distribution evaluation value indicates whether the hue values "Hj" of the predetermined areas are distributed in both directions from the hue value "Hd" of the target color.

The color correction of the predetermined color areas is performed based on the correction coefficient determined based on the single overall representative color "M" and the target color "D". When the distribution evaluation value "E" is "1", the correction coefficient that corrects from the single overall representative color "M" to the target color "D" is set, and the color correction is performed based on the set correction coefficient. By doing in this way, when hue values of the representative colors of the predetermined colors areas are distributed in one direction from the hue value of the target color, each of the representative colors is corrected to the target value using the single overall representative color "M" determined by placing higher weight on the predetermined color area having a higher importance level. On the other hand, when the representative colors of the predetermined colors areas are distributed in both directions from the hue value of the target color, no color correction is performed to prevent the case where a representative color is corrected to the direction opposite to the direction closer to the target color.

In the above embodiments, when the distribution evaluation value "E" is not "1", the color correction is not performed. However, as another method, when the distribution evaluation value "E" is not "1", the representative colors of the predetermined color areas may be divided into two groups by using the hue value of the target color as the reference (boundary) value, and depending on the importance levels of the two groups, only the representative colors in one group having a higher importance level may be corrected.

Figure 6:
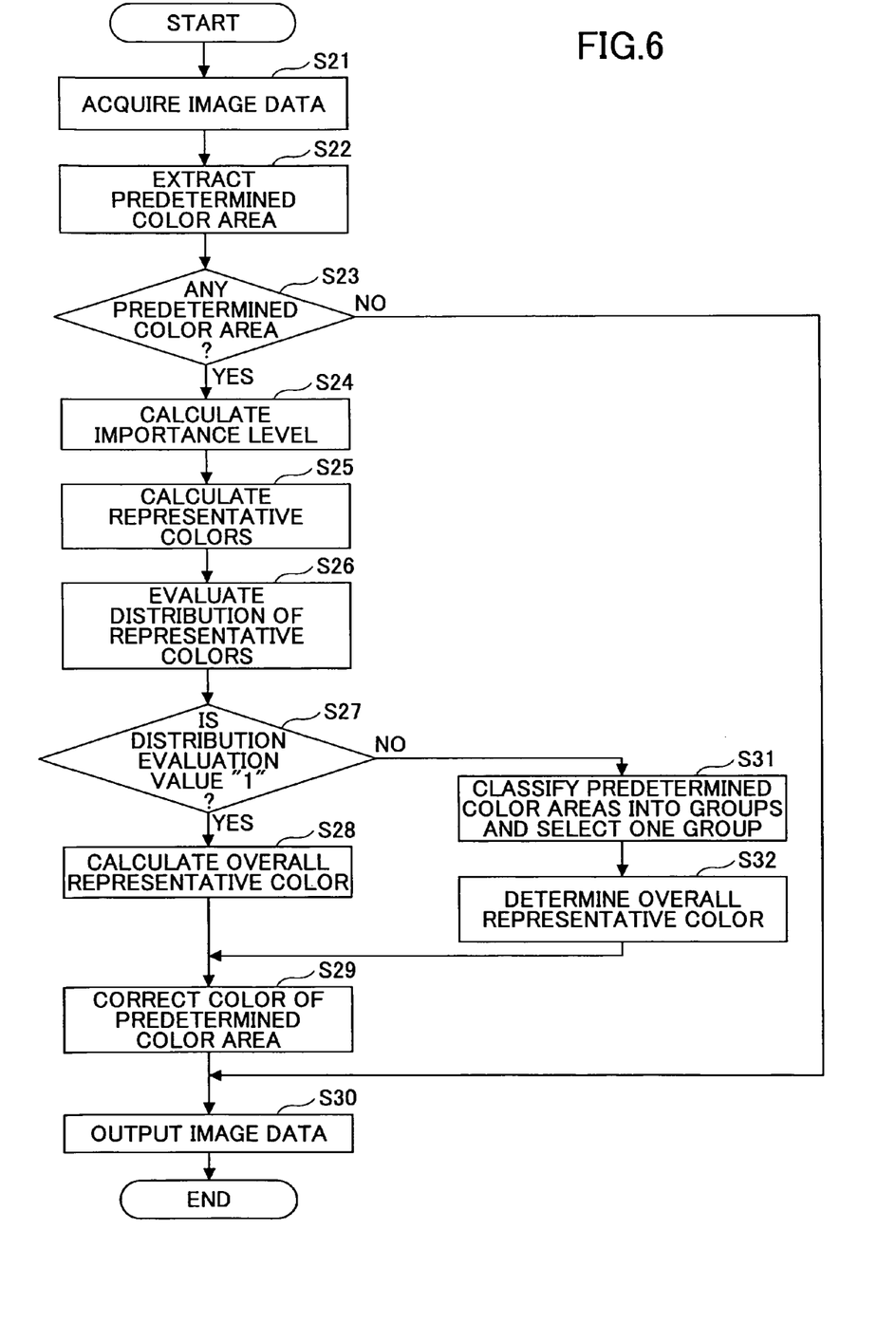
FIG. 6 is a flowchart showing an image correction process according to a modified second embodiment of the present invention.

FIG. 6 shows a flowchart showing a color correction process in the above case. In the flowchart of FIG. 6, the process of steps S21 through S26 are performed in the same manner as in the process of steps S11 though S16 in FIG. 4. In step S27, it is determined whether the distribution evaluation value "E" is not "1". When it is determined that the distribution evaluation value "E" is not "1" (NO in step S27), the process goes to step S31. Otherwise (YES in step S27), the process goes to step S28. In step S28, the single overall representative color "M" as the entire input image is determined based on each of the representative colors and the importance levels of the corresponding predetermined color areas. The same method described above may be used to determine the single overall representative color "M", therefore the description of the method is omitted.

In step S31, by using the hue value of the target color of the predetermined color areas as a reference (boundary) value, each representative color "Dj" is classified as one group in which the sign of the "Dj" is "+" or as the other group in which the sign of the "Dj" is "−". Then, one of the groups is selected depending on the importance levels of the two groups.

Next, in step S32, the single overall representative color "M" is determined (calculated) by weighted averaging the predetermined color areas based on the importance levels of the predetermined color areas belonging to the group selected in step S31. In step S29, the correction coefficient is set that corrects from the determined single overall representative color "M" to the target color "D", and the input (received) image data is corrected based on the determined correction coefficient. In step S30, the corrected image data or the input image data is output.

In this case of step S31, as the method of selecting one group from the classified two groups based on the importance levels of the two groups, a method of selecting one group having greater total values of the importance levels of the predetermined color areas than the other group is used. By doing in this way, in a case where it is determined that the distribution evaluation value "E" is not "1", it may become possible to perform the color correction on the representative colors of the predetermined color areas belonging to the group determined as the group having higher importance of the two groups classified by using the hue value of the target color as the reference value. In this embodiment, the distribution of the representative colors of the predetermined color areas is evaluated based on the hue value of the target color. However, the distribution may be evaluated based on other factors such as a chroma value or a luminosity value.

Third Embodiment

In the following, a third embodiment of the present invention is described. In the third embodiment, the input image is displayed in accordance with the results of the distribution of the representative colors of the predetermined color areas with respect to the target color, so that a user can designate (select) the predetermined color area having a higher importance level for the user, and the color of the input image is corrected based on the representative color of the predetermined color area designated by the user.

Figure 7:
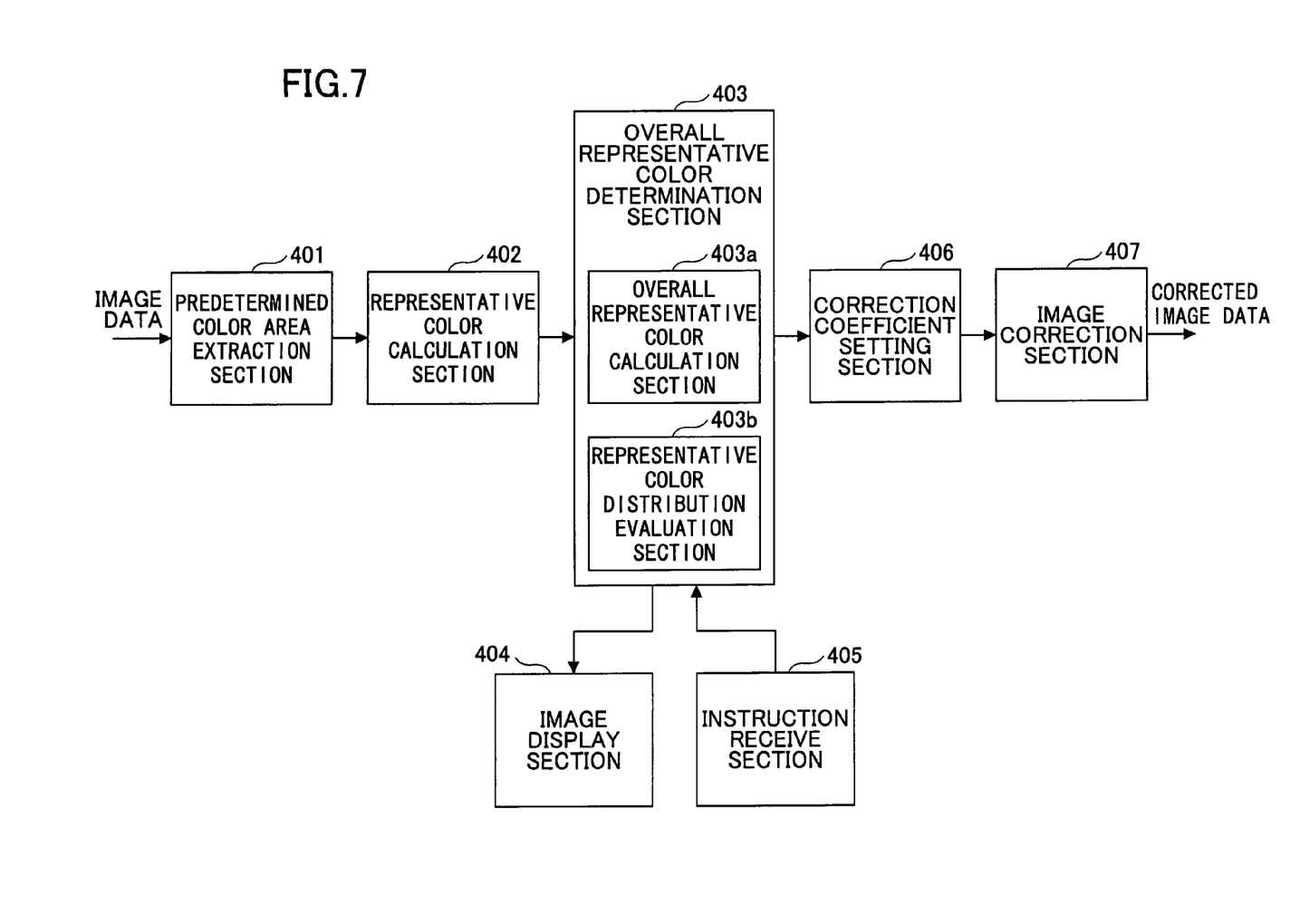
FIG. 7 is a drawing showing a configuration of an image processing apparatus according to a third embodiment of the present invention.

FIG. 7 shows an exemplary configuration of the image processing apparatus according to the third embodiment of the present invention. As shown in FIG. 7, the image processing apparatus includes a predetermined color area extraction section 401, a representative color calculation section 402, an overall representative color determination section 403 having an overall representative color calculation section 403a and a representative color distribution evaluation section 403b, an image display section 404, an instruction receive section 405, a correction coefficient setting section 406, and an image correction section 407. Each of the predetermined color area extraction section 401 and the representative color calculation section 402 is similar to the corresponding sections in first and second embodiments. The representative color distribution evaluation section 403b estimates how the representative colors of the extracted predetermined color areas are distributed with respect to the correction target color of the predetermined color areas set in advance. Namely, the representative color distribution evaluation section 403b calculates the differences between the representative colors of the predetermined color areas and the correction target color of the predetermined color areas set in advance and outputs the distribution evaluation result based on the calculation results.

The overall representative color calculation section 403a of the overall representative color determination section 403 determines the single overall representative color from the representative colors of one or more predetermined color areas based on an instruction from the instruction receive section 405 described in detail below.

The image display section 404 displays not only the image data input to the image processing apparatus but also the image data of the predetermined color areas extracted by the predetermined color area extraction section 401. The instruction receive section 405 receives an instruction from a user, the instruction selecting which of the predetermined color areas is to be used for the color correction, the predetermined color areas being displayed on the image display section 404 and reports the received instruction to the overall representative color determination section 403. The correction coefficient setting section 406 determines (sets) the correction coefficient to be used in the image correction section 407 based on the overall representative color determined by the overall representative color determination section 403 and the correction target color of the predetermined color areas set in advance.

Figure 8:
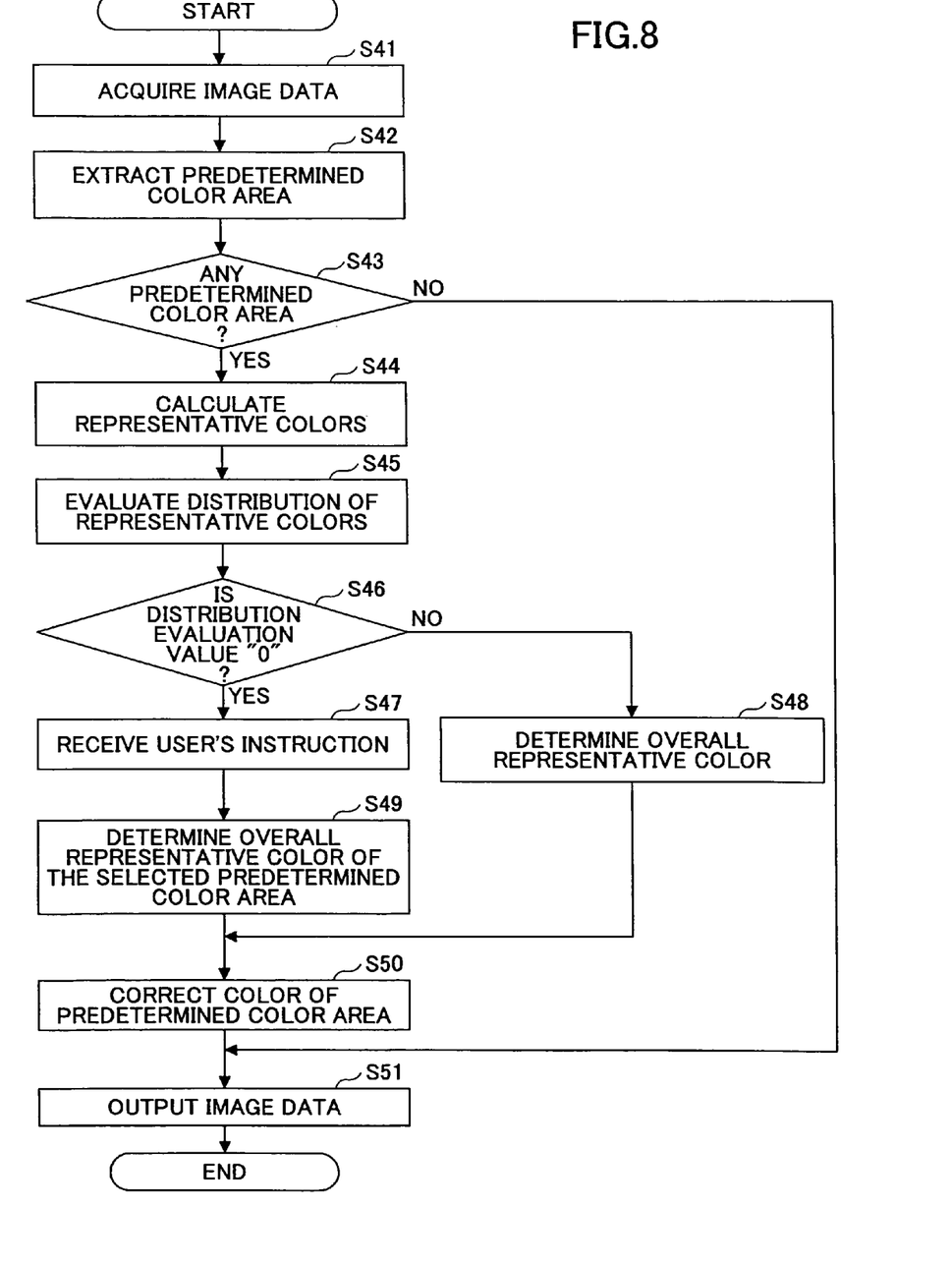
FIG. 8 is a flowchart showing an image correction process according to the third embodiment of the present invention.

FIG. 8 shows a flowchart showing an image correction process according to the third embodiment of the present invention. In the flowchart of FIG. 8, the process of steps S41 through S45 are performed in the same manner as in the process of steps S21 though S25 in the second embodiment of FIG. 6. In step S46, the representative color distribution evaluation section 403b determines whether the distribution evaluation value is "0". When it is determined that the distribution evaluation value is not "0" (NO in step S46), the process goes to step S48. In step S48, the overall representative color is determined, and in step 50, the colors of the predetermined color areas are corrected based on the determined overall representative color.

On the other hand, when it is determined that the distribution evaluation value is "0" (YES in step S46), the process goes to step S47. In step S47, the image display section 404 displays the image data and the image data of the extracted predetermined color areas, and the instruction receive section 405 receives an instruction from a user selecting which of the predetermined color areas is to be used for the color correction. In step S49, the overall representative color determination section 403 determines the single overall representative color from the representative colors of one or more predetermined color areas based on the instruction from the user. In step S50, the image correction section 407 performs the color correction on the predetermined color areas based on the overall representative color determined in step S48 or S49. In step S51, the correction image data are output.

The method of extracting the predetermined color area is the same as the method described in the first embodiment of the present invention. The calculation to obtain the representative color is performed with respect to each of the extracted predetermined color areas. In this case, for example, the representative color is calculated by averaging RGB values in the predetermined color area.

The evaluation of the distribution of the representative colors is performed based on the comparison between the representative color of the predetermined color area and the target color "DD" in the predetermined color area set in advance, and the distribution evaluation value "0" or "1" is obtained. The representative colors of the predetermined color areas are expressed in RGB values and are converted into the LHC (Luminosity, Chroma, Hue) space. However, the representative colors may be converted into other color spaces such as YCbCr, $L^*u^*v^*$, HSV, and HSL. In a case where the target color (data) are stored in the LCH space as well, a difference between the hue value of the representative color and the hue value of the target color is calculated.

Index numbers are uniquely allocated to the predetermined color areas, and when a symbol "N" denotes the number of extracted predetermined color areas, a symbol "Hj" denotes a hue value of the "j"th predetermined color area (1≦j≦N), and a symbol "Hd" denotes a hue value of the target color "D", the difference in hue value "Dj" (1≦j≦N) is described as Dj=Hd−Hj. Next, the sign of the "Dj" is evaluated. In this evaluation, it is determined whether all the signs of "Dj" is the same regardless of the sign being "+" or "−". When it is determined that all the signs of "Dj" is the same, data "1" is assigned to the distribution evaluation value "E". Otherwise, data "0" is assigned to the distribution evaluation value "E". This distribution evaluation value indicates whether the hue values "Hj" of the predetermined areas are distributed in both directions from the hue value "Hd" of the target color.

In the process of determining the overall representative color in step S48, the single overall representative color "M" is determined based on the representative colors of the extracted predetermined color areas. The overall representative color "M" may be calculated by averaging the representative colors of the extracted predetermined color areas.

In the process of determining the overall representative color in step S49, the single overall representative color "M" is determined based on the representative colors of the predetermined color areas designated by a user. When only one predetermined color area is designated by a user, the representative color of the designated predetermined color area becomes the single overall representative color "M". On the other hand, when more than one predetermined color area is designated by a user, the single overall representative color "M" may be calculated by averaging the representative color of the plural predetermined color areas.

The color correction on the predetermined color areas is performed by setting the correction coefficient that corrects from the determined single overall representative color "M" to the target color "D". By doing this, in a case where the representative colors of the predetermined areas are distributed in both directions from the hue value of the target color, if the color correction is performed based on the overall representative color that is calculated automatically, there may be a case where the representative color of the predetermined color area that is important for a user may be corrected in the direction opposite to the direction closer to the target color. However, as described above, by making it possible to allow a user to select (designate) one or more predetermined color areas as important predetermined colors areas for the user, calculating the overall representative color based on the designated predetermined color areas, and performing the color correction based on the calculated overall representative color based on the designated predetermined color areas, it may become possible to overcome the trouble. In addition, when the representative colors of the predetermined areas are distributed in one direction from the hue value of the target color, the representative colors of the predetermined color areas are corrected in the same direction to the target color. Therefore, in this case, by omitting the process of requesting a user to select the predetermined color area, it becomes possible to perform the color correction while reducing the burden (operations) of the user. In this embodiment, the distribution of the representative colors of the predetermined color areas is evaluated based on the hue value of the target color. However, the distribution may be evaluated based on other factors such as a chroma value or a luminosity value.

Figure 9:
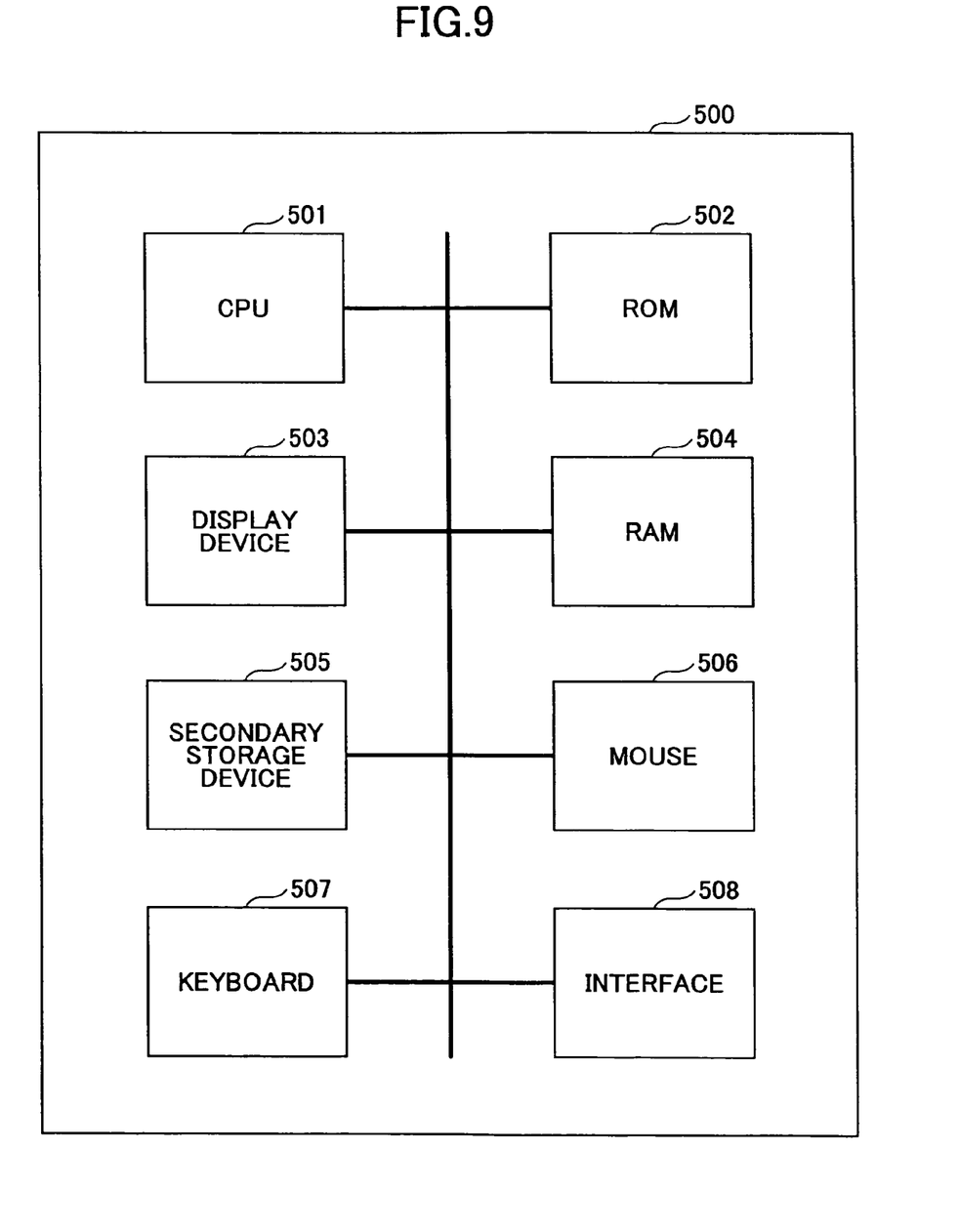
FIG. 9 is an exemplary hardware configuration for carrying out an embodiment of the present invention.

FIG. 9 shows a PC (personal computer) 500 as an exemplary hardware configuration of an image processing apparatus when the present invention is embodied using software. As shown in FIG. 9, the PC 500 includes a CPU 501, a ROM 502, a display device 503, a RAM 504, a secondary storage device 505, a mouse 506, a keyboard 507, and an interface 508. The CPU 501 controls the entire operations of the PC 500. The ROM 502 stores programs and data accessed by the CPU 501. The RAM 504 temporarily stores an application program and an OS loaded from the secondary storage device 505 and executed by the CPU 501. Further, the RAM 504 provides a working area where various data are stored upon a process being performed by the CPU 501. An OS and various applications are installed in the secondary storage device 505 and are loaded to the RAM 504 to be executed. The interface 508 may include serial interfaces such as a USB (Universal Serial Bus) interface and an IEEE 1394 interface and network interfaces for connecting network lines such as the Internet and an LAN.

With such a configuration, the functions of each section shown in FIG. 1 can be executed by the CPU 501. Further, the image processing functions executed by the CPU 501 may be distributed by using a software package, i.e., a data recording medium such as a CD-ROM and a magnetic disk.

As apparent from the above description, an image processing apparatus and an image processing method according to an embodiment of the present invention may be embodied by causing a general-purpose computing system having a display and the like to read a program recorded in a data recording medium such as a CD-ROM so as to cause the CPU of the general-purpose computing system to execute the image processing. In this case, the programs to be executed to perform the image processing of the present invention, that is, the programs to be used in such a hardware configuration, may be provided as a recording medium in which the programs are stored. The recording media for recording the programs and the like is not limited to a CD-ROM but may include a ROM, a RAM, a flash memory, and a magnet-optical disk. The programs stored in the recording medium can be executed to perform the image processing functions after being installed in the secondary storage device integrated in the hardware configuration.

Further, the programs to achieve the image processing functions according to an embodiment of the present invention may be provided not only as the recording medium but also by being transmitted from a server through communications via a network.

According to an embodiment of the present invention, there is provided an image processing apparatus including a predetermined color area extraction unit extracting predetermined color areas from an input image, a representative color calculation unit calculating representative colors of the extracted predetermined color areas, an importance level determination unit determining an importance level with respect to each of the extracted predetermined color areas, a distribution evaluation unit evaluating a pattern of a distribution of the representative colors of the extracted predetermined color areas, an overall representative color determination unit determining an overall representative color to be corrected based on the calculated representative colors and the importance levels of the predetermined color areas, a color correction condition setting unit setting color correction conditions based on the overall representative color to be corrected and the pattern of the distribution of the calculated representative colors of the predetermined color areas, and a color correction unit performing color correction on the input image based on the color correction conditions.

An object of the configuration is that the overall representative color to be corrected is determined based on the calculated representative colors and the importance levels of the predetermined color areas and the color correction conditions are set based on the pattern of the distribution of the calculated representative colors of the predetermined color areas.

In this configuration, the overall representative color to be corrected is determined based on the importance levels of the predetermined color areas and the pattern of a distribution of the representative colors of the extracted predetermined color areas is evaluated. Therefore, when there is no predetermined color areas that would be separated from the target color upon the color correction being performed, it becomes possible to perform color correction to the target color by focusing on the predetermined color areas having a higher importance level. However, when there is the predetermined color areas that would be separated from the target color upon the color correction being performed, the color correction cannot be performed.

According to an embodiment of the present invention, the color correction condition setting unit may set the color correction conditions based on the overall representative colors and the importance levels of the predetermined color areas belonging to one group selected based on importance levels from among plural groups classified from the extracted predetermined color areas based on the evaluation result of the pattern of the distribution.

An object of the configuration is to set the color correction conditions that leads to perform color correction to the target color on the predetermined color areas that belong to a group selected as a group having a higher importance level, the group being selected from groups classified based on the evaluation result of the pattern of the distribution of the predetermined color areas.

Further, in this configuration, the predetermined color areas are classified into groups based on the evaluation result of the distribution of the extracted predetermined color groups, and one group is selected from the groups based on the importance levels of the predetermined color areas to set the color correction conditions. Therefore, even when there is the predetermined color area that would separate from the target color upon the color correction being performed, it may becomes possible to set the color correction conditions so that the predetermined color areas in the group having a higher importance level become closer to the target color.

According to an embodiment of the present invention, the image processing apparatus further includes a display unit displaying the input image and the extracted predetermined color areas based on the evaluation of the pattern of the distribution and a selection instruction unit allowing a user to select one or more predetermined color areas from among the displayed predetermined color areas. Further, the overall representative color determination unit determines the overall representative color to be corrected based on the representative colors of the predetermined color areas selected by the user and the color correction condition setting unit sets color correction conditions based on the overall representative color to be corrected.

An object of the configuration is to, when the predetermined color areas are distributed in both directions from the target color, allow a user to designate the predetermined color area on a display means on which the input image and the extracted predetermined color areas are displayed and set the color correction conditions based on the designated predetermined color area and perform color correction based on the set color correction conditions. To that end, according to this embodiment, in accordance with the result of the evaluation of the representative colors of the extracted predetermined color areas, the input image and the extracted predetermined color areas are displayed on the display means, and the representative color of the predetermined color areas selected by the user is determined as the overall representative color to be corrected. Then, based on the determined overall representative color, the color correction conditions are set.

Another object of the configuration is to, when the predetermined color areas are not distributed in both directions from the target color, set the color correction conditions and perform the color correction without displaying the input image and the predetermined color areas on the display means and without causing a user to designate the predetermined color area.

With this configuration, based on the evaluation result of the distribution of the predetermined color areas, a user is requested to select the predetermined color area which is important for the user. Therefore, when there is the predetermined color area that would separate from the target color upon the color correction being performed, it becomes possible to set the color correction conditions so that the representative color of the predetermined color area selected by the user becomes closer to the target color.

According to an embodiment of the present invention, the pattern of a distribution of the representative colors of the extracted predetermined color areas may be evaluated based on a difference from a hue value of a correction target color set in advance as a reference.

An object of the configuration is to evaluate whether the hue values of the representative colors of the predetermined color areas are distributed in both directions from a boundary which is the hue value of the target color. To that end, with this configuration, the pattern of the distribution of representative color areas is evaluated based on the difference from the hue value of the correction target color.

By doing this, it becomes possible to determine in which direction from the hue value of the target color the representative color area is located. Namely, it becomes possible to know whether this is the predetermined color areas that would separate from the hue value of the target color after the color correction is performed.

According to an embodiment of the present invention, the pattern of a distribution of the representative colors of the extracted predetermined color areas may be evaluated based on a difference from chroma value of correction target color set in advance as a reference.

An object of the configuration is to evaluate whether the chroma values of the representative colors of the predetermined color areas are distributed in both directions from a boundary which is the chroma value of the target color. To that end, with this configuration, the pattern of the distribution of representative color areas is evaluated based on the difference from the chroma value of the correction target color.

By doing this, it becomes possible to determine in which direction from the chroma value of the target color the representative color area is located. Namely, it becomes possible to know whether this is the predetermined color areas that would separate from the chroma value of the target color after the color correction is performed.

According to an embodiment of the present invention, the pattern of a distribution of the representative colors of the extracted predetermined color areas may be evaluated based on a difference from luminosity value of correction target color set in advance as a reference.

An object of the configuration is to evaluate whether the luminosity values of the representative colors of the predetermined color areas are distributed in both directions from a boundary which is the luminosity value of the target color. To that end, with this configuration, the pattern of the distribution of representative color areas is evaluated based on the difference from the luminosity value of the correction target color.

By doing this, it becomes possible to determine in which direction from the luminosity value of the target color the representative color area is located. Namely, it becomes possible to know whether this is the predetermined color areas that would separate from the luminosity value of the target color after the color correction is performed.

According to an embodiment of the present invention, the importance level may be determined based on the size of the predetermined color area.

An object of the present invention is to set the importance level in proportion to the area (size) of the predetermined color area by determining the importance level of the predetermined color area based on the size of the predetermined color area.

Namely, in this configuration, the importance level of the predetermined color area is determined based on the size of the predetermined color area. Therefore, it becomes possible to set the importance of the predetermined color area based on the size of the predetermined color area.

According to an embodiment of the present invention, the importance level may be determined based on the position of the predetermined color area in the input image.

An object of the present invention is to set the importance level based on the position of the predetermined color area in the input image by determining the importance level of the predetermined color area based on the position of the predetermined color area in the input image.

Namely, in this configuration, the importance level of the predetermined color area is determined based on the position of the predetermined color area in the input image. Therefore, it becomes possible to set the importance of the predetermined color area based on the position of the predetermined color area in the input image.

[0019](=claim 11)+[0030]

According to an embodiment of the present invention, the predetermined color area may be a skin area that includes a human face.

An object of the configuration is to perform the color correction in accordance with a feature of the skin area that includes a human face because, in this case, the predetermined color area is the skin area that includes a human face.

By having this configuration, it becomes possible to perform color correction on the skin area when the predetermined color area is the skin area including a human face.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    an extraction unit configured to extract predetermined color areas from an input image;
    a calculation unit configured to calculate each of representative colors of the extracted predetermined color areas;
    an evaluation unit configured to evaluate whether hue values of the representative colors of the predetermined color areas are distributed in both directions from the hue value of a target color; and
    a color correcting unit configured to, when it is determined that the hue values of the representative colors of the predetermined color areas are not distributed in both directions from the hue value of the target color, perform color correction on the predetermined color areas.

2. The image processing apparatus according to claim 1, wherein
    the predetermined color area is a skin area that includes a human face.

3. An image processing apparatus comprising:
    a predetermined color area extraction unit configured to extract predetermined color areas from an input image;
    a representative color calculation unit configured to calculate representative colors of the extracted predetermined color areas;
    a distribution evaluation unit configured to evaluate a pattern of a distribution of the representative colors of the extracted predetermined color areas;
    an overall representative color determination unit configured to determine an overall representative color to be corrected based on the calculated representative colors of the predetermined color areas;
    a color correction condition setting unit configured to set color correction conditions based on the overall representative color to be corrected and the pattern of the distribution of the calculated representative colors of the predetermined color areas; and
    a color correction unit configured to perform color correction on the input image based on the color correction conditions.

4. The image processing apparatus according to claim 3, further comprising:
    an importance level determination unit configured to determine an importance level with respect to each of the extracted predetermined color areas, wherein
    the overall representative color determination unit determines the overall representative color to be corrected based on the calculated representative colors and the importance levels of the predetermined color areas.

5. The image processing apparatus according to claim 4, wherein
    the color correction condition setting unit sets the color correction conditions based on the overall representative color and the importance levels of the predetermined color areas belonging to one group selected based on importance levels from among plural groups classified from the extracted predetermined color areas based on the evaluation result of the pattern of the distribution.

6. The image processing apparatus according to claim 3, further comprising:
    a display unit configured to display the input image and the extracted predetermined color areas based on the evaluation of the pattern of the distribution; and
    a selection instruction unit configured to allow a user to select one or more predetermined color areas from among the displayed predetermined color areas, wherein
    the overall representative color determination unit determines the overall representative color to be corrected based on the representative colors of the predetermined color areas selected by the user; and
    the color correction condition setting unit sets color correction conditions based on the overall representative color to be corrected.

7. The image processing apparatus according to claim 3, wherein
    the pattern of the distribution of the representative colors of the extracted predetermined color areas is evaluated based on a difference from a hue value of a correction target color set in advance as a reference.

8. The image processing apparatus according to claim 3, wherein the pattern of the distribution of the representative colors of the extracted predetermined color areas is evaluated based on a difference from chroma value of a correction target color set in advance as a reference.

9. The image processing apparatus according to claim 3, wherein the pattern of the distribution of the representative colors of the extracted predetermined color areas is evaluated based on a difference from a luminosity value of a correction target color set in advance as a reference.

10. The image processing apparatus according to claim 4, wherein the importance level is determined based on a size of the predetermined color area.

11. The image processing apparatus according to claim 4, wherein the importance level is determined based on a position of the predetermined color area in the input image.

12. A non-transitory computer-readable recording medium storing a computer-readable program capable of causing a computer to execute the image processing method comprising:

color areas from an input image;

a calculation step of calculating each of the representative colors of each of the extracted color areas;

determining whether hue values of the representative colors of the predetermined color areas are distributed in both directions from the hue value of a target color; and performing color correction on the color areas, using a processor, when it is determined that the hue values of the representative colors of the predetermined color areas are not distributed in both directions from the hue value of the target color.

* * * * *